(12) United States Patent
Belsom et al.

(10) Patent No.: US 8,919,125 B2
(45) Date of Patent: Dec. 30, 2014

(54) APPARATUS AND SYSTEMS RELATING TO FUEL INJECTORS AND FUEL PASSAGES IN GAS TURBINE ENGINES

(75) Inventors: Keith Cletus Belsom, Laurens, SC (US); Donald Timothy Lemon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 805 days.

(21) Appl. No.: 13/176,784

(22) Filed: Jul. 6, 2011

(65) Prior Publication Data

US 2013/0008169 A1 Jan. 10, 2013

(51) Int. Cl.
*F02C 7/22* (2006.01)
*F23R 3/34* (2006.01)
*F23R 3/50* (2006.01)
*F01D 25/00* (2006.01)
*F23D 14/48* (2006.01)
*F23D 14/50* (2006.01)

(52) U.S. Cl.
CPC ............. *F23R 3/346* (2013.01); *F01D 25/002* (2013.01); *F02C 7/22* (2013.01); *F02C 7/222* (2013.01); *F23D 14/48* (2013.01); *F23D 14/50* (2013.01); *F23R 3/34* (2013.01)
USPC .................................. 60/737; 60/739; 60/760

(58) Field of Classification Search
USPC .................. 60/725, 734, 737, 739, 740, 760
See application file for complete search history.

(56) References Cited

U.S. PATENT DOCUMENTS

| 5,475,979 | A * | 12/1995 | Oag et al. ..................... 60/737 |
| 6,526,741 | B2 | 3/2003 | Whitehead et al. |
| 6,598,383 | B1 | 7/2003 | Vandervort et al. |
| 2010/0043391 | A1 * | 2/2010 | Fang et al. .................... 60/211 |
| 2011/0056206 | A1 * | 3/2011 | Wiebe ........................... 60/740 |
| 2011/0083701 | A1 | 4/2011 | Esmacher et al. |
| 2011/0289928 | A1 * | 12/2011 | Fox et al. ...................... 60/740 |

FOREIGN PATENT DOCUMENTS

| EP | 0687864 A2 | 12/1995 |
| EP | 2375163 A2 | 10/2011 |
| WO | 9919674 A1 | 4/1999 |

OTHER PUBLICATIONS

Search Report and Written Opinion from EP Application No. 12175436.0 dated Oct. 23, 2012.

* cited by examiner

*Primary Examiner* — Andrew Nguyen
(74) *Attorney, Agent, or Firm* — Mark E. Henderson; Ernest G. Cusick; Frank A. Landgraff

(57) ABSTRACT

A combustor casing fuel injector in a combustor of a combustion turbine engine, the combustor including a combustor casing that encloses internal structure of the combustor, wherein the combustor casing fuel injector includes a fuel manifold adjacent to an outer surface of the combustor casing. In certain embodiments, the combustor casing fuel injector includes a fuel injector; wherein the fuel injector extends through the combustor casing from a position within the fuel manifold to a predetermined fuel injection location; and wherein the fuel injector includes a protruding injector inlet within the fuel manifold.

19 Claims, 4 Drawing Sheets

APPARATUS AND SYSTEMS RELATING TO FUEL INJECTORS AND FUEL PASSAGES IN GAS TURBINE ENGINES

BACKGROUND OF THE INVENTION

The present disclosure generally relates to apparatus and systems for fuel passages within gas turbine engines, and more particularly relates to apparatus and systems for fuel passages that reduce flow variation due to rust and debris within a fuel supply.

Gas turbine engines include a compressor, a combustor, and a turbine. The compressor creates compressed air, which is supplied to the combustor. The combustor combusts the compressed air with fuel to generate an air-fuel mixture, which is supplied to the turbine. The turbine extracts energy from the air-fuel mixture to drive a load. In many cases, the gas turbine includes a number of combustors. The combustors may be positioned between the compressor and the turbine. For example, the compressor and the turbine may be aligned along a common axis, and the combustors may be positioned between the compressor and the turbine at an entrance to the turbine, in a circular array about the common axis. In operation, air from the compressor may travel into the turbine through one of the combustors.

The combustors may be operated at a relatively high temperature to ensure the mixture of air and fuel is adequately combusted, improving efficiency. One problem with operating the combustors at a high temperature is that a relatively high level of nitrogen oxides (NOx) may be generated, which may have a negative impact on the environment.

To reduce NOx emissions, many modern gas turbines employ fuel nozzles. For example, each combustor may be supported by a number of fuel nozzles, which may be positioned in a circular array about the combustor. During normal operation, the air from the compressor enters the combustor via the fuel nozzles. Within the fuel nozzles the air is mixed with fuel to form an air-fuel mixture. The air-fuel mixture is then combusted in the combustor. Pre-mixing the air and fuel permits operating the combustors at relatively lower temperatures, which reduces the NOx produced as a by-product of the combustion process.

To achieve further performance advantages, many combustors employ fuel injectors that are positioned upstream of the fuel nozzles. One such system, for example, is a fuel injector that is integrated within the combustor casing, which may be referred to herein as a combustor casing fuel injector. This type of fuel injector may be referred to as an annular quaternary fuel distributor. As described in more detail below, this type of system injects fuel into the compressed air discharged by the compressor as this flow of air moves toward the fuel nozzles. In certain cases, as described in more detail below, the combustor casing fuel injector injects fuel into an annulus passageway that is defined by the combustor casing and the cap assembly. It will be appreciated by one of ordinary skill in the art that pre-mixing fuel in this manner may be employed to mitigate combustor instability, to provide better fuel/air mixing, improve flame holding margin of the downstream fuel nozzles, as well as to reduce NOx emissions.

However, combustor casing fuel injectors present their own problems. Typically, in such systems, fuel is delivered into the combustion system by flowing from the gas manifold into an annulus that is integral to the combustion casing. From there the fuel flows down individual peg injectors or pegs that protrude into the air flow stream (i.e., into the annulus passageway that is defined between the combustor casing and the cap assembly). The fuel of the combustor casing fuel injector then is injected into the flowstream via small holes (~0.05") that are positioned along the peg injectors. It will be appreciated that this fuel mixes with the flow of compressed air and, downstream, is combusted within the burning zone or combustion chamber of the combustor.

In order meet cost objectives, the annular fuel manifold of the combustor casing fuel injector is constructed as an integral component of the combustor casing. As such, the annular fuel manifold is made of carbon steel, which, over time, means that rust will develop within this fuel passageway. Liberated rust pieces or other debris within the supply of fuel flow down into the pegs and cause a blockage, which may block fuel from flowing into the pegs, flowing through the pegs, or exiting the pegs through the injection holes. It will be appreciated that such blocked may lead to performance issues, such as less efficient engine operation, flame holding, emission problems, etc.

One solution, calls for the combustor casing fuel manifold to be made from materials that will not rust, such as Inco 625 alloy. This, however, raises costs considerably. Coatings that prevent rust also have been tested; however, as of yet, these have not proven successful. Accordingly, there is a need for apparatus and systems that effectively prevent rust and other debris from clogging combustor casing fuel injectors, while remaining cost-effective in application.

BRIEF DESCRIPTION OF THE INVENTION

The present application thus describes a combustor casing fuel injector in a combustor of a combustion turbine engine, the combustor including a combustor casing that encloses internal structure of the combustor, wherein the combustor casing fuel injector includes a fuel manifold adjacent to an outer surface of the combustor casing. In certain embodiments, the combustor casing fuel injector includes a fuel injector; wherein the fuel injector extends through the combustor casing from a position within the fuel manifold to a predetermined fuel injection location; and wherein the fuel injector includes a protruding injector inlet within the fuel manifold.

These and other features of the present application will become apparent upon review of the following detailed description of the preferred embodiments when taken in conjunction with the drawings and the appended claims.

BRIEF DESCRIPTION OF THE DRAWINGS

The present disclosure may be better understood with reference to the following figures. Matching reference numerals designate corresponding parts throughout the figures, and components in the figures are not necessarily to scale.

DETAILED DESCRIPTION OF THE INVENTION

Figure 1:
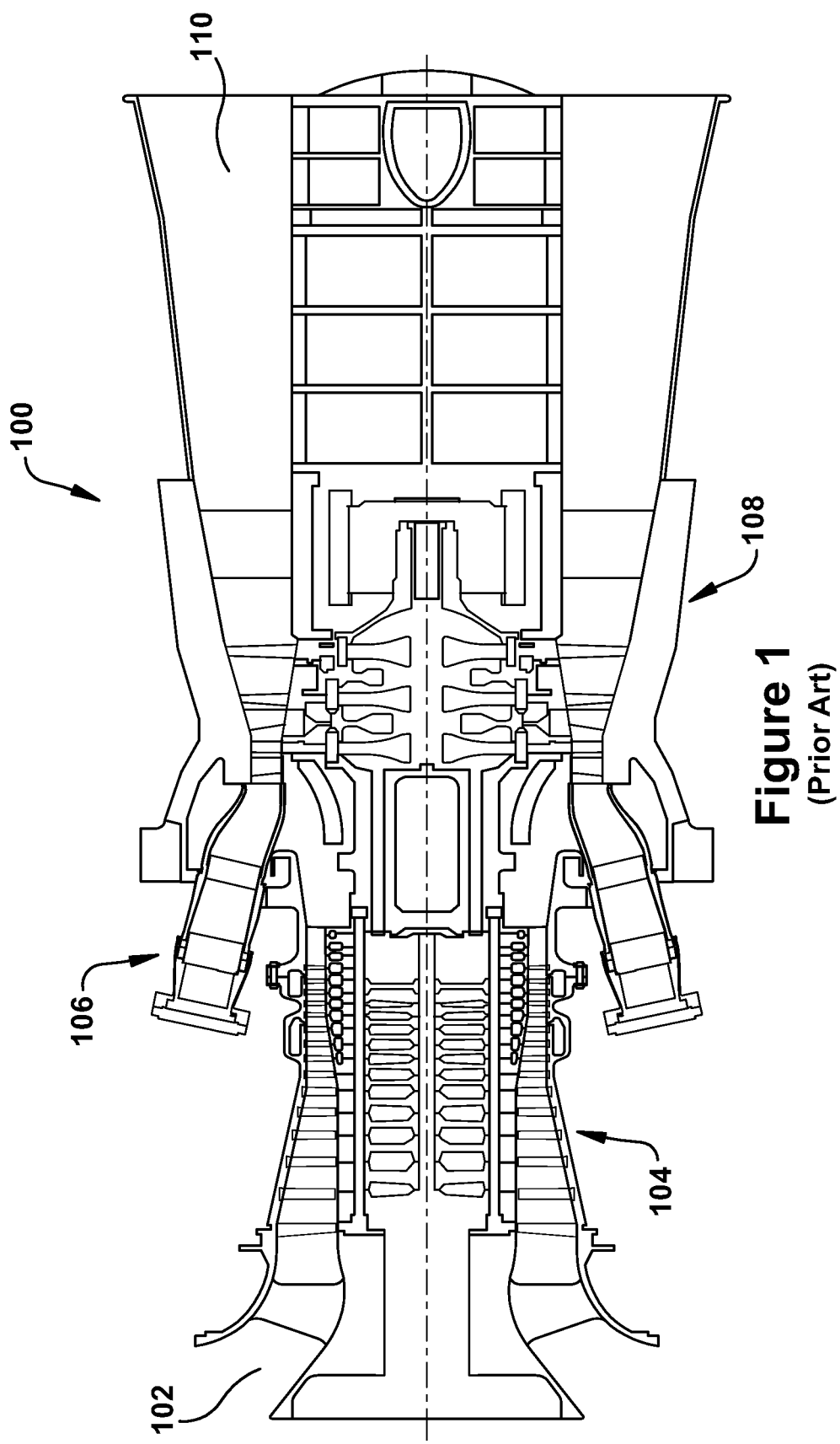
FIG. 1 is a cross-sectional view of a known gas turbine engine, schematically illustrating a combustion system in which embodiments of the present invention may be employed.
Figure 2:
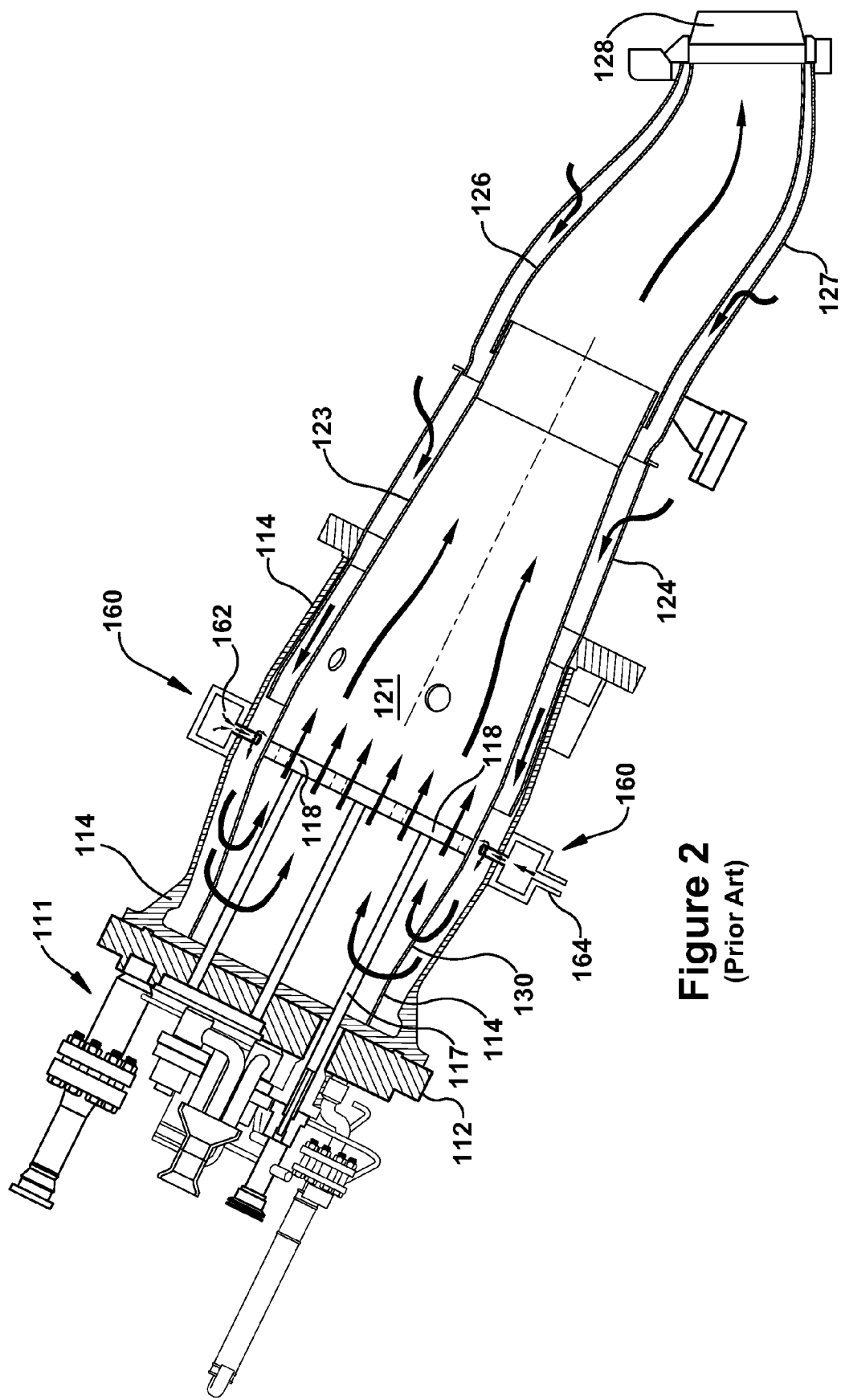
FIG. 2 is a cross-sectional view of a known combustor, schematically illustrating a fuel passage of conventional design.

FIG. 1 is a partial cross-sectional view of a known gas turbine engine 100 in which embodiments of the present invention may be used. As shown, the gas turbine engine 100 generally includes an intake section 102, a compressor 104, one or more combustors 106, a turbine 108, and an exhaust section 110. Each combustor 106 may include one or more fuel nozzles 118, as shown in FIG. 2. The fuel nozzles 118 may be in parallel to each other in an array. For example, the fuel nozzles 118 may be arranged about an entrance to the combustor 106, such as in a circular configuration about a longitudinal axis of the combustor 106.

A flow path may be defined through the gas turbine 100. During normal operation, air may enter the gas turbine 100 through the intake section 102. The air may flow into the compressor 104, which may compress the air to form compressed air. The compressed air may flow through the fuel nozzles 118, which may mix the compressed air with fuel to form an air-fuel mixture. The air-fuel mixture may flow into the combustor 106, which may burn the air-fuel mixture to generate hot gases. The hot gases may flow into the turbine 108, which may extract energy from the hot gases, forming exhaust. Thereafter, the exhaust may be exhausted from the gas turbine 100 through the exhaust section 110.

FIG. 2 illustrates an exemplary combustor 106 in a gas turbine engine in which embodiments of the present invention may be used. As one of ordinary skill in the art will appreciate, the combustor 106 may include a headend 111, which generally includes the various manifolds that supply the necessary air and fuel to the combustor 106, and an end cover 112. The combustor 106 may be enclosed within a combustor casing 114, as shown. A plurality of fuel lines 117 may extend through the end cover 112 to fuel injectors or fuel nozzles 118 that are positioned at the aft end of a cap assembly 119. The fuel nozzles 118, which may also be referred to as primary fuel injectors, represent the main source of fuel within the combustor 106. It will be appreciated that the cap assembly 119 generally is cylindrical in shape and fixed at a forward end to the end cover 112. The cap assembly 119 may be surrounded by the combustor casing 114. It will be appreciated by those of ordinary skill in the art that between the combustor casing 114 and the cap assembly 119, a combustor casing annulus 120 is formed.

In general, the fuel nozzles 118 bring together a mixture of fuel and air for combustion. The fuel, for example, may be natural gas and the air may be compressed air (the flow of which is indicated in FIG. 2 by the several arrows) supplied from the compressor 104. As one of ordinary skill in the art will appreciate, downstream of the fuel nozzles 118 is a combustion chamber 121 in which the combustion occurs. The combustion chamber 121 is generally defined by a liner 123, which is enclosed within a flow sleeve 124. Between the flow sleeve 124 and the liner 123 an annulus is formed. From the liner 123, a transition duct 126 transitions the flow from the circular cross section of the liner 123 to an annular cross section as it travels downstream to the turbine section (not shown in FIG. 4). An impingement sleeve or outer wall 127 (hereinafter "outer wall 127") may enclose the transition duct 126, also creating an annulus between the outer wall 127 and the transition duct 126. At the downstream end of the transition duct 126, a transition piece aft frame 128 may direct the flow of the working fluid toward the airfoils that are positioned in the first stage of the turbine 108. It will be appreciated that the flow sleeve 124 and the outer wall 127 typically have impingement apertures (not shown in FIG. 2) formed therethrough which allow an impinged flow of compressed air from the compressor 106 to enter the cavities formed between the flow sleeve 124 and the liner 123 and between the outer wall 127 and the transition duct 126. The flow of compressed air through the impingement apertures convectively cools the exterior surfaces of the liner 123 and the transition duct 126.

As shown, the cap assembly 119 may include a series of inlets 130 through which the supply of compressed air enters the interior of the cap assembly 119. The inlets 130 may be arranged parallel to each other, being spaced around the circumference of the cylindrical cap assembly 119, though other configurations are possible. In this arrangement, it will be appreciated that struts are defined between each of the inlets 130, which support the cap assembly structure during operation. It will be appreciated that the compressed air entering the combustor 106 through the flow sleeve 124 and the outer wall 127 is directed toward the cap assembly 119 via the flow annulus formed about the liner 123 and the transition duct 126. The compressed air then passes through the combustor casing annulus 120, which, as stated is section of the flow annulus that is formed between the cap assembly 119 and the combustor casing 114. Then, the compressed air enters the cap assembly 119 via the inlets 130, which are typically formed toward the forward end of the cap assembly 119. Upon entering the cap assembly 119, the flow of compressed air turn approximately 180° such that it moves toward the fuel nozzles 118 that are positioned toward the aft end of the cap assembly 119.

It will be appreciated that the combustor of FIG. 2 further includes a fuel injector upstream of the fuel nozzles 118, which will be referred to herein as a combustor casing fuel injector 160. As stated, and unless otherwise stated, a combustor casing fuel injector 160 includes a fuel injector within the combustion system of a gas turbine engine 100 that injects fuel into the flow path at a position that is downstream of the compressor 104 and upstream of the fuel nozzles 118. In certain embodiments, however, a combustor casing fuel injector 160 is defined as a fuel injector that is positioned to inject fuel into the combustor casing annulus 120. FIG. 2 provides an example of this type of combustor casing fuel injector 160.

More specifically, FIG. 2 depicts an annular quaternary fuel distributor, which, as one of ordinary skill in the art will appreciate, is a known type of combustor casing fuel injector 160. As described in more detail below, this type of fuel injection system injects fuel into the compressor discharge as it moves through the combustor casing annulus 120. Premixing fuel in this manner may be employed to mitigate combustor instability, to provide better fuel/air mixing, improve flame holding margin of the downstream fuel nozzles, as well as to reduce NOx, CO or other emissions.

As illustrated in FIG. 2, the exemplary annular quaternary fuel distributor 160 includes an annular fuel manifold 162 that may encircle (either in segments or continuously) the combustor 106. The fuel manifold 162 typically abuts and is attached to the combustor casing 114. As stated, the fuel manifold 162 may be formed as an integral component of the combustor casing 114. The fuel manifold 162 may include one or more manifold inlets 164 through which a supply of fuel is delivered to the fuel manifold 162.

Figure 3:
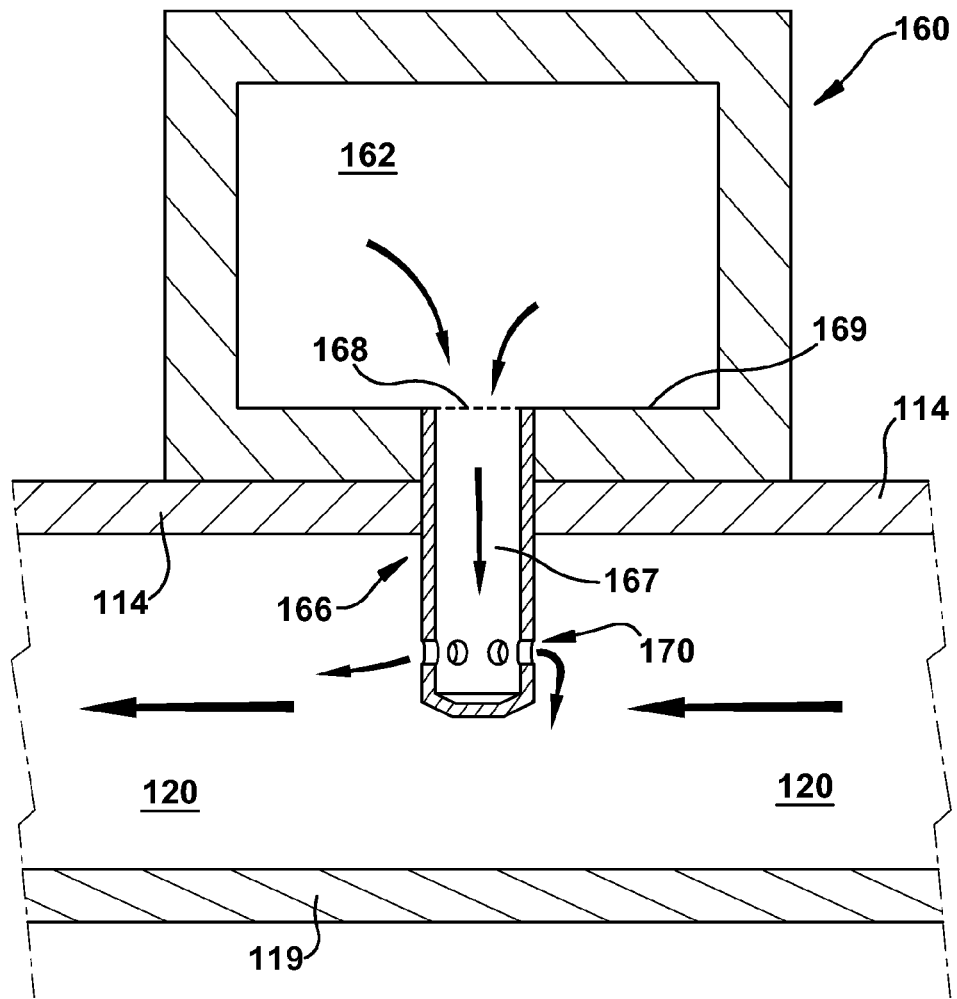
FIG. 3 is a cross-sectional view of the fuel passage of FIG. 2.

As shown in more detail in FIG. 3, the annular quaternary fuel distributor 160 also may include a plurality of fuel injectors 166 spaced at intervals around the combustor 106. As shown, the fuel injectors 166 often are formed as pegs (though other configurations are possible). The fuel injectors 166 may define a fuel passageway 167 that extends from the fuel manifold 162 to a position within the flow annulus where injection of the fuel takes place. As used herein, the term "flow annulus" may be used to refer to the annulus formed between the combustor casing 114 and the structure enclosed within the combustor casing 114 (which, includes, the cap assembly 119, the liner 123, and the transition duct 126). Often, the fuel injectors 166 are positioned such that the fuel is injected into the combustor casing annulus 120 that is formed between the cap assembly 119 and the combustor casing 114. At a connection with the fuel manifold 162, the fuel injector 166 may include an injector inlet 168. Per conventional design, the injector inlet 168 may be positioned on an inner radial surface 169 of the fuel manifold 162 and may extend to injector outlets 170 that are positioned within the combustor casing annulus 120 (or other preferred injection location). The injector outlets 170 may be positioned near the distal end of the fuel injector 166. It will be appreciated that the fuel injectors 166 may be installed through the combustor casing 114. It will be further appreciated that the main function of the combustor casing fuel injector 160 is to inject fuel into the flow of air upstream of the fuel nozzles 118 so that a desirable fuel-air mixture is created. In certain embodiments, the combustor casing fuel injector 160 may inject the fuel into the flow of compressed air at a position upstream of where the flow enters the interior of the cap assembly 119 (i.e., upstream of the inlets 130). Those of ordinary skill in the art will appreciate that the use of the combustor casing fuel injector 160 of FIG. 2 is exemplary only. Embodiments of the present invention may be applicable to other types of combustor casing fuel injectors 160.

As described, known types of combustor casing fuel injectors, particularly annular quaternary fuel injectors with a peg design, are susceptible to having portions of their fuel flowpath blocked by debris, which is typically in the form of rust dislodged from within the fuel manifold 162. As one of ordinary skill in the art will appreciate, this may cause damage to the combustion system, inefficient operation, and other issues. As stated, addressing this issue by using rust-free materials within the fuel manifold 162 is unsatisfactory due to high costs. In addition, the usage of coatings to prevent rusting has proven unworkable.

Figure 4:
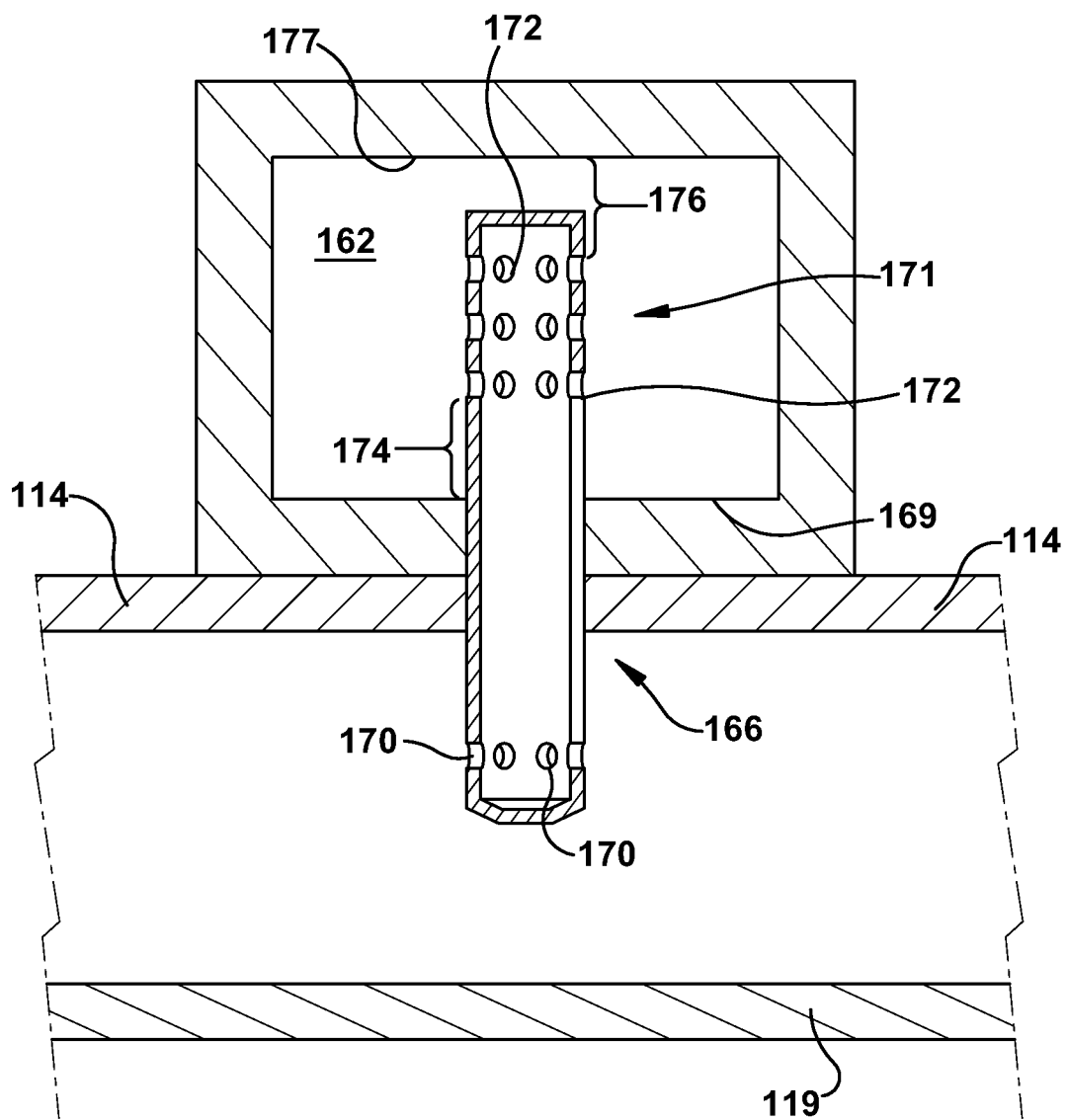
FIG. 4 is a cross-sectional view of a fuel passage within a combustor, schematically illustrating an exemplary embodiment in accordance with the present invention.

FIG. 4 is a cross-sectional view of a combustor casing fuel injector 160 in accordance with an exemplary embodiment of the present invention. As shown, the fuel injector 166 may include a protruding injector inlet 171. In accordance with the present invention, the protruding injector inlet comprises a section of the fuel injector 166 that juts from the inner radial surface 169 of the fuel manifold 162 to a position within the interior of the fuel manifold 162 and provides an injector inlet that is offset from the interior walls of the fuel manifold, as described in more detail below. Accordingly, in certain embodiments, the protruding injector inlet 171 may include a protrusion that extends from a position on the inner radial surface 169 of the fuel manifold 162 to a position near the radial center of the fuel manifold 162. The protruding injector inlet 171, as illustrated, may include a plurality of filtering apertures 172, which provide an inlet through which fuel within the fuel manifold 162 may enter the fuel passageway 167 of the fuel injector 166. The filtering apertures 172 each may include a position on the protruding injector inlet such that a minimum aperture offset or clearance 174 is maintained between the radial height of the filtering aperture 172 and the inner radial surface 169 of the fuel manifold 162. It will be appreciated that, formed in this way, the protruding injector inlet 171 includes features similar to that of certain types of standpipe drains. This is because the protruding injector inlet 171 is configured to drain fuel from a position that is offset a distance from the surface through which the fuel is drained.

As stated, the plurality of filtering apertures 172 may be positioned on the protruding injector inlet 171 such that each maintains at least a minimum aperture clearance or offset 174 from the inner radial surface 169 of the fuel manifold 162. In certain embodiments, the length of the protruding injector inlet 171 and the positioning of the filtering apertures 172 on the protruding injector inlet may be configured such that a minimum aperture clearance or offset 176 from an outer radial surface 177 of the fuel manifold 162 is maintained. In certain preferred embodiments, the filtering apertures 172 include a location near the radial center of the fuel manifold 162.

In certain embodiments, the protruding injector inlet 171 extends from the inner radial surface 169 of the fuel manifold 162 in a manner such that it is approximately perpendicular to the inner radial surface 169. In certain embodiments, the fuel injector 166 may be approximately cylindrical in shape. The section of the fuel injector 166 that comprises the protruding injector inlet 171 also may be cylindrical in shape and, as described, may define a cylindrically fuel passageway 167 within it, as shown. The fuel passageway 167 may extend from the filtering apertures 172 within the fuel manifold 162 to the injector outlets 170 within the combustor casing annulus. Though, the fuel injectors 166 often are formed as pegs or cylindrically-shaped components, it will be appreciated that the present invention may be employed in fuel injectors having a different shape.

As stated, the protruding injector inlet 171 may include a plurality of filtering apertures 172. The filtering apertures 172 may be positioned on the protruding injector inlet 171 such that fuel is allowed to flow into the fuel passageway 167 at positions that are offset from the inner radial surface 169 of the fuel manifold 162. It will be appreciated that this offset allows the filtering apertures 172 to draw from a layer of fuel within the fuel manifold 162 that would typically contains less debris (including rust debris) than if the fuel inlet were otherwise located, for example, such as the manner in which the injector inlet 168 is configured in FIG. 3. More specifically, given the configuration shown in FIG. 4, the debris (particularly rust debris) will tend to settle toward the inner radial surface 169 of the fuel manifold 162. As such, the debris will be less likely to be drawn into filtering apertures 172 which are offset a minimum distance from this surface.

Further, as stated, the filtering apertures 172 may be desirably offset from the outer radial surface 177 of the fuel manifold 162. It will be appreciated that, depending on the angular position of the protruding injector inlet 171 along the exterior of the combustor casing 114, gravitational effects may cause the debris to settle toward either of the interior radial surfaces of the fuel manifold 162, i.e., the inner radial surface 169 or the outer radial surface 177. In addition, it will be appreciated that centrifugal forces may cause debris to settle toward the outer radial surface 177 depending on the flow patterns within the manifold 162. Accordingly, by having the filtering apertures 172 positioned within the fuel manifold 162 such that each maintains a position toward the radial center of the manifold, the fuel injectors 166 will be less likely to become clogged with the debris that typically tends to settle toward the radial surfaces within the fuel manifold 162. Accordingly, the fuel injectors 166 will be less likely to become clogged with ingested debris. This is particularly true of debris, like rust, that is heavy relative to the fuel flowing through the combustion system, as heavy particles will settle more rapidly.

In one preferred embodiment, the positioning of the filtering apertures 172 (i.e., the maintained aperture clearances 174, 176) varies in accordance to the gravitational effects at the particular location of one of the protruding injector inlets 171 within the fuel manifold 162. Thus, where gravitational effects would tend to settle debris toward the inner radial surface 169 of the fuel manifold 162, the filtering apertures 172 may be configured on the protruding injector inlet 171 such that an increased aperture clearance 174 from the inner radial surface 169 is maintained. Where the opposite is true (i.e., where gravitational effects would tend to settle debris toward the outer radial surface 177 of the fuel manifold 162), the filtering apertures 172 may be configured on the protruding injector inlet 171 such that an increased aperture clearance 176 from the outer radial surface 177 is maintained.

In certain embodiments, the filtering apertures 172, generally, are offset from the inner radial surface 169 by at least a fixed distance. It will be appreciated that the minimum distance by which the filtering apertures 172 are offset from the inner radial surface 169 may also be expressed as a percentage of the overall radial height of the fuel manifold 162. It has been found that performance advantages are noticed when this offset is at least 20% of the radial height of the fuel manifold 162. More preferably, this offset is at least 40% of the radial height of the fuel manifold 162.

In certain embodiments, the filtering apertures 172 are offset from the outer radial surface 177 by at least a fixed distance. The distance by which the filtering apertures 172 are offset from the outer radial surface 177 may also be expressed as a percentage of the overall height of the fuel manifold 162. It has been found that performance advantages are noticed when this offset from the outer radial surface 177 is at least 20% of the radial height of the fuel manifold 162. More preferably, this offset is at least 40% of the radial height of the fuel manifold 162.

Additionally, per embodiments of the present invention, filtering apertures 172 each may be sized such that the apertures filter or block debris from entering the fuel passageway 167 of the fuel injector 166. In some preferred embodiments, the filtering apertures 172 include a circular shape, though other shapes are possible. In preferred embodiments, the filtering apertures 172 are sized in relation to the injector outlets 170 positioned at the other end of the fuel injectors 166. In this case, the filtering apertures 172 generally are sized such that they are no larger than the injector outlets 170. In this way, debris that is small enough to enter the fuel passageway 167 of the fuel injector 166 via the filtering apertures 172 should also be small enough to flow out of the fuel injector 166 through the injector outlets 170. In a preferred embodiment, the filtering apertures 172 are sized such that they are no larger than 70% of the size of the injector outlets 170. It will be appreciated that, in this case, the 30% buffer provides a greater likelihood that any debris that passes through the filtering apertures 172 will also pass through the injector outlets 170, even when multiple pieces of debris are flowing through the injector outlets 170 at the same time. When the filtering apertures 172 and injector outlets 170 are circular in shape, "size" may refer to diameter. If, instead, the filtering apertures 172 and the injector outlets 170 are rectangular in shape, "size" may refer to the distance from opposing corners. More generally, "size" may refer to the longest linear span across the filtering aperture 172/injector outlet 170.

Further, the protruding injector inlet 171 may include a sufficient number of filtering apertures 172 so that an increased pressure drop is not experienced across the fuel injectors 166. In this manner, the present invention may be implemented such that an appreciable pressure drop across the injection system is not experienced.

Those of ordinary skill in the art will appreciate that the present invention provides a convenient, cost-effective solution to a nagging problem. This allows the casing and annulus to be made out of carbon steel and not require higher cost materials, coatings, or other processes that add cost.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A combustor casing fuel injector in a combustor of a combustion turbine engine, the combustor including a combustor casing that encloses internal structure of the combustor, wherein the combustor casing fuel injector includes a fuel manifold adjacent to an outer surface of the combustor casing, the combustor casing fuel injector comprising:
    fuel injectors;
    wherein the fuel injectors extend through the combustor casing from a position within the fuel manifold to a predetermined fuel injection location;
    wherein the fuel injectors include a protruding injector inlet within the fuel manifold;
    wherein the fuel manifold comprises an annular fuel manifold that wraps around the combustor casing and the fuel injectors are located at predetermined angular positions about the combustor casing, the fuel manifold comprising an inner radial surface opposed relative an outer radial surface;
    wherein the protruding injector inlet comprises a protrusion, which juts from the inner radial surface of the fuel manifold, and a plurality of apertures; and
    wherein a first minimum aperture clearance between the apertures and the inner radial surface of the fuel manifold and a second minimum aperture clearance between the apertures and the outer radial surface of the fuel manifold are configured such that each varies in relation to the expected effect of gravity on sinking debris given the predetermined angular position of each of the fuel injectors.

2. The combustor casing fuel injector according to claim 1,
    wherein the fuel injectors includes a fuel passageway defined therein;
    wherein each of the plurality of apertures comprises an inlet through which the fuel manifold fluidly communicates with the fuel passageway; and
    wherein the first minimum aperture clearance comprises a minimum distance by which each of the apertures is offset from the inner radial surface of the fuel manifold.

3. The combustor casing fuel injector according to claim 2, wherein the predetermined fuel injection location comprises a flow annulus that is formed between the combustor casing and the internal structure;

wherein the fuel injectors comprises an injector outlet disposed within the flow annulus that is configured to fluidly connect the fuel passageway of the fuel injectors to the flow annulus;

wherein the fuel passageway is configured to fluidly connect each of the plurality of apertures to the injector outlet; and wherein the protruding injector inlet comprises an enclosed section that coincides with the first minimum aperture clearance, the enclosed section containing sealed structure that is configured to prevent fuel from entering the fuel passageway at any point along the enclosed section.

4. The combustor casing fuel injector according to claim 3, wherein the combustor casing fuel injector comprises an annular quaternary fuel distributor; and wherein the fuel manifold comprises an integral component to the combustor casing.

5. The combustor casing fuel injector according to claim 3, wherein the inner radial surface resides adjacent to the combustor casing; and wherein the protruding injector inlet comprises a section of the fuel injectors that juts from the inner radial surface of the fuel manifold to a position near a midpoint between the inner radial surface and the outer radial surface.

6. The combustor casing fuel injector according to claim 5, wherein the internal structure comprises a cap assembly having an approximate cylindrical shape; and wherein the predetermined fuel injection location comprises positions within the annulus formed between the cap assembly and the combustor casing.

7. The combustor casing fuel injector according to claim 6, wherein the fuel injectors comprises an approximate cylindrical shape;

wherein the fuel passageway within the fuel injectors comprises an approximate cylindrical shape; and wherein the protruding injector inlet extends approximately perpendicular from the inner radial surface of the fuel manifold.

8. The combustor casing fuel injector according to claim 6, wherein the plurality of apertures comprise a plurality of filtering apertures, wherein each of the plurality of filtering apertures comprises an aperture having a predetermined size, the predetermined size corresponding to a desired particle size to be filtered by the plurality of filtering apertures; and the protruding injector inlet comprises a length and the filtering apertures comprise a configuration on the protruding injector inlet such that the first minimum aperture clearance from the inner radial surface is maintained.

9. The combustor casing fuel injector according to claim 8, wherein the second minimum aperture clearance comprises a minimum distance by which each of the filtering apertures is offset from the outer radial surface of the fuel manifold; and the protruding injector inlet comprises a length and the filtering apertures comprise a configuration on the protruding injector inlet such that the second minimum aperture clearance from the outer surface is maintained.

10. The combustor casing fuel injector according to claim 8, wherein each of the plurality of filtering apertures is sized relative to the injector outlet; and wherein the size of each of the plurality of filtering apertures is no larger than the size of the injector outlet.

11. The combustor casing fuel injector according to claim 10, wherein the size of each of the plurality of filtering apertures is no larger than 70% of the size of the injector outlet.

12. The combustor casing fuel injector according to claim 11, wherein the plurality of filtering apertures and the injector outlet comprise a circular cross-sectional shape; and wherein the sizes comprises the diameter of the circular cross-sectional shape.

13. The combustor casing fuel injector according to claim 11, wherein the sizes comprises a longest linear span across the filtering apertures and the injector outlet.

14. The combustor casing fuel injector according to claim 8, wherein the number and flow area of the plurality of filtering apertures are configured based upon a desired pressure drop across the fuel injectors.

15. The combustor casing fuel injector according to claim 1, wherein, at the predetermined angular positions at which the expected effect of gravity settles sinking debris toward the inner radial surface of the fuel manifold, the filtering apertures comprise an increase to the first minimum aperture clearance; and wherein, at the predetermined angular positions at which the expected effect of gravity settles sinking debris toward the outer radial surface of the fuel manifold, the filtering apertures comprise an increased to the second minimum aperture clearance.

16. The combustor casing fuel injector according to claim 8, wherein the fuel manifold comprises a radial height measuring the approximate distance from the inner radial surface to the outer radial surface; and wherein the first minimum aperture clearance comprises at least 20% of the height of the fuel manifold.

17. The combustor casing fuel injector according to claim 8, wherein the fuel manifold comprises a radial height measuring the approximate distance from the inner radial surface to the outer radial surface; and wherein the first minimum aperture clearance comprises at least 40% of the height of the fuel manifold.

18. The combustor casing fuel injector according to claim 9, wherein the fuel manifold comprises a radial height measuring the approximate distance from the inner radial surface to the outer radial surface; and wherein the second minimum aperture clearance comprises at least 20% of the height of the fuel manifold.

19. The combustor casing fuel injector according to claim 9, wherein the fuel manifold comprises a radial height measuring the approximate distance from the inner radial surface to the outer radial surface; and wherein the second minimum aperture clearance comprises at least 40% of the height of the fuel manifold.

* * * * *

UNITED STATES PATENT AND TRADEMARK OFFICE
CERTIFICATE OF CORRECTION

Page 1 of 1

PATENT NO.      : 8,919,125 B2
APPLICATION NO. : 13/176784
DATED           : December 30, 2014
INVENTOR(S)     : Belsom et al.

It is certified that error appears in the above-identified patent and that said Letters Patent is hereby corrected as shown below:

In the Specification

In Column 3, Line 65, delete "compressor 106" and insert -- compressor 104 --, therefor.

In the Claims

In Column 8, Line 56, in Claim 2, delete "includes" and insert -- include --, therefor.

In Column 9, Line 1, in Claim 3, delete "comprises" and insert -- comprise --, therefor.

In Column 9, Line 20, in Claim 5, delete "claim 3," and insert -- claim 3, wherein the combustor casing comprises an approximate cylindrical shape; --, therefor.

In Column 9, Line 34, in Claim 7, delete "comprises" and insert -- comprise --, therefor.

In Column 9, Lines 36-37, in Claim 7, delete "comprises" and insert -- comprise --, therefor.

In Column 10, Line 13, in Claim 12, delete "comprises" and insert -- comprise --, therefor.

In Column 10, Line 16, in Claim 13, delete "comprises" and insert -- comprise --, therefor.

In Column 10, Line 31, in Claim 15, delete "increased" and insert -- increase --, therefor.

Signed and Sealed this
Fifth Day of May, 2015

Michelle K. Lee
*Director of the United States Patent and Trademark Office*